United States Patent Office 3,357,945
Patented Dec. 12, 1967

3,357,945
POLYOLEFINS STABILIZED WITH A SYNERGISTIC ADDITIVE COMBINATION OF A PHENOL AND A DIALKYLTHIODIPROPIONATE
Francis M. Seger, Metuchen, N.J., assignor to Mobil Oil Corporation, a corporation of New York
No Drawing. Filed Mar. 27, 1964, Ser. No. 355,465
5 Claims. (Cl. 260—45.85)

ABSTRACT OF THE DISCLOSURE

Polyolefins stabilized with a synergistic additive combination of a phenol and a dialkylthiodiproprionate.

This invention relates to new compositions of poly-α-olefins and more particularly to such compositions comprising solid polymers of propylene. All these new compositions have improved stability to oxidative degradation at elevated temperatures.

The polymers of α-olefins, such as ethylene, propylene, butene-1, and the like, are important articles of commerce and are ordinarily prepared in accordance with many well-known procedures, including catalytic polymerization at various temperatures and pressures. Processing these polymers for commercial applications usually involves extrusion, molding, rolling, etc. at elevated temperatures to facilitate flow. In many cases, the finished polymer articles, e.g. electrical insulators, are exposed to elevated temperatures during use. These exposures to such elevated temperatures usually result in oxidative degradation of the polymers. In order to avoid such obviously undesirable results, various anti-oxidants or stabilizers have been added to the polymers with varying success. The use of the prior art chemical additives frequently does act to extend the service life of the polymers. However, such additives, alone or in combination, do not prevent all loss in tensile strength, flexibility, melt flow or other necessary and desirable properties without some problems of cost, handling difficulty, toxicity, volatility, odor, exudation or other objection. Hindered phenols have been found to be relatively effective as stabilizers, due, it is believed, to the fact that the hydroxyl group of the phenol is "blocked" by the other substituents of these complex phenols. The phenols in which the OH group is not blocked or hindered are generally ineffective as stabilizers.

It is an object of this invention to provide compositions comprising solid α-olefin polymers, which compositions have improved resistance against degradation, particularly at elevated temperatures. It is another object to provide tactic α-olefin polymer compositions in the form of molded and extruded articles, self-supporting films, fibers, coatings and the like, which are stable against degradation. It is still another object to provide new compositions comprising major amounts of a solid tactic α-olefin polymer and minor amounts of a synergistic combination of compounds that improves the stability of the polyolefin against heat-caused deterioration. It is an especial object to stabilize tactic polypropylene against oxidative degradation at elevated temperatures. Other objects will be apparent from the description and claims that follow.

The tactic polymers, as contemplated herein, are the solid linear polymers of one or more olefinic hydrocarbons having the formula $CH_2=CHR$, wherein R is a cycloalkyl radical, or an alkyl radical having between 1 and 8 carbon atoms per radical. The term "tactic" is a generic term applied to polymers in which there is an ordered structure with respect to the configurations around at least one main-chain site of steric isomerism per conventional base unit. Numerous types of tacticity are recognized in the art. Within the contemplation of this invention, a measure of steric order is the weight percent of the solid polymer that is insoluble in boiling n-heptane. A linear polymer of one or more monoolefinic hydrocarbons that is insoluble in boiling n-heptane is considered to be tactic.

The linear tactic polymers used in compositions of this invention may be composed of isotactic or syndiotactic chains, blocks or mixtures of these forms. The terms isotactic and syndiotactic are used in accordance with the suggested definitions tentatively approved by the commission on Macromolecules of the International Union of Pure and Applied Chemistry, as outlined in the Journal of Polymer Science, vol. 56, pp. 153–161 (1962). When prepared from two or more olefin monomers, the tactic polymer can be a block copolymer comprised of tactic blocks of each monomer. In practice, tactic polymers often contain sequences of atactic units in conjunction with tactic sequences. These polymers containing atactic sequences can still be insoluble in boiling n-heptane and they are tactic polymers within the contemplation of this invention. The polymers utilizable in this invention are at least 80 percent tactic or 80 percent insoluble in boiling n-heptane, and usually they are 95 percent, or more, tactic. Non-limiting examples of tactic polymers contemplated herein are polypropylene, poly-1-butene, poly-1-pentene, poly-1-hexene, poly-1-heptene, poly-3-methyl-1-butene, poly-4-methyl-1-pentene, poly-3,3-dimethyl-1-butene, poly-4,4-dimethyl-1-pentene, poly-4-methyl-1-hexene, poly-5-methyl-1-hexene, polyvinyl cyclohexane.

The above and other objects are attained by admixing the tactic α-olefin polymer with a synergistic stabilizer combination comprising an unhindered phenol and a diester of 3,3'-thiodipropionic acid having the following formula:

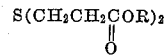

in which R is an alkyl radical containing between about 8 and about 20 carbon atoms and preferably between about 10 and about 18 carbon atoms. Typical esters are those in which R is octyl, nonyl, decyl, lauryl, cetyl, stearyl, myristyl, tridecyl, pentadecyl, heptadecyl, and eicosyl. The lauryl and stearyl esters, which are generally available and inexpensive, are most often preferred.

The unhindered phenol used in the present stabilizer combination is prepared by catalytically alkylating phenol with a polyolefin chain, e.g. a polypropylene oil of 500–800 molecular weight to give a compound represented by the following structural formula:

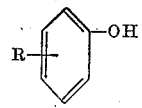

in which R is a polymer chain of an α-olefin polymer having a molecular weight of between about 300 and about 1200. Typical are the polymer chains of ethylene, propylene and butylene. The chain is essentially connected in the position para to the hydroxyl. In the alkylation, there may be formed admixtures of compounds in which the polymer chain may be in the positions ortho or meta to the hydroxyl, as well as in the para position. Such mixtures are effective for the present invention if the para compound is a substantial portion of the mixture. The amount of polyolefin reacted with the phenol is not too critical, but it is generally preferable to alkylate one mole of the phenol with about one mole of the polyolefin oil.

The unhindered phenols used in the present invention do not block the activity of the hydroxyl group of the phenol. Hence, these unhindered phenols, alone, have little stabilizing effect. However, when admixed with the thioesters used herein, a synergistic stabilization effect is obtained, so that the combination gives surprisingly superior results which are far greater than the mere additive stabilizing action to be expected.

The tactic polymer compositions of this invention can contain small amounts of other ingredients for specific purposes. Such materials include pigments, such as carbon black and phthalocyanines; and lubricants, such as aluminum, lead, and zinc stearates and microcrystalline wax. The amount of these materials in the composition will be small, usually not exceeding a few percent by weight.

To determine the stabilizing effects of the synergistic combinations of the present invention, several of the combinations were blended with tactic polypropylene having an Isotactic Index of about 95 and a melt index of 3. Polypropylene blends were also made using the separate compounds utilized in the synergist combinations. These blends were compression molded into smooth sheets or plates about 0.030 in. thick, and tested for stability against high temperature and oxidative degradation. The sheets were observed for initial transmission of light and were then placed in an oven maintained at 140° C. and observed from day to day. Extreme brittleness or disintegration of samples was considered as failure to stabilize and effectiveness for less than 40 days was considered inadequate. In addition to the initial reading of light transmission, loss of light transmission was determined at 10-day intervals. Transmission of less than 75 scale units was a secondary criterion for rating a sample as inferior. The transmission of light was determined on the Gardner Hazemeter in which the light beam, without a sample in the beam, represents 100 scale units (ASTM D1003-59T).

Similarly blends were prepared using the same base polypropylene with some of the better prior art stabilizer materials, separately and in combination. These blends were tested in the same manner as the compositions of the present invention and the results compared with the other tests.

The test samples were prepared in each instance by mixing the powdered polypropylene with the stabilizer, singly or in combination, and pressure molding the mixture into sheets as already noted.

The results of the tests are set forth in the following table, in which "DLTDP" indicates dilauryl-3,3'-thiodipropionate:

As can be observed from the data set out in the above table, those compositions containing the combinations of unhindered phenol and sulfur compound, in accordance with this invention, were marked by superior stabilizing ability as compared to any of the single stabilizers or the prior art combinations. These results are even more significant in view of the fact that, on a cost basis, the polypropylphenol is less than one third the cost of a typical prior art phenol (2,6-di-t-butyl-4-methyl phenol, a hindered phenol). The ratio of the polyolefin unhindered phenol to the thiopropionic esters may be varied widely, although for maximum results ratios of 1:4 to 4:1, respectively, on a weight basis, are generally preferred. The amounts of synergistic combination of non-hindered phenol and thioester may be varied widely, but for reasons of economy is preferably kept at minimal amounts which are effective. Generally about 0.1 to about 3.0% by weight, of stabilizer, relative to the base polyolefin, is adequate.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A homogenous composition comprising a tactic poly-α-olefin and a minor amount of a stabilizer synergist combination comprising a diester of 3,3'-thiodipropionic acid having the formula:

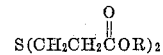

wherein R is an alkyl radical having 8 to 20 carbon atoms and a non-hindered phenol having the formula

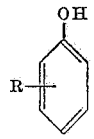

wherein R is a polybutene chain having a molecular weight of about 300 to about 1200.

2. The composition of claim 1, in which said synergist

TABLE

| Phenolic Additive Weight Percent | Sulfur-Con't. Additive, Wt. Percent | Days to Failure | 140° C. Oven Test Transmission "C" | | | |
|---|---|---|---|---|---|---|
| | | | Initial | 20 Days | 40 Days | 60 Days |
| None | None | 2 | 83.7 | | | |
| Do | 1.0 DLTDP | 55 | 85.7 | | | |
| Do | 0.5 DLTDP | 47 | 84.3 | | | |
| Do | 0.25 DLTDP | 32 | 84.7 | | | |
| 0.5 2,6-di-t-butyl-4-methylphenol | None | 10 | 83.8 | | | |
| 0.1 2,6-di-t-butyl-4-methylphenol | 0.3 DLTDP | 31 | 82.8 | 76.8 | | |
| 0.2 2,6-di-t-butyl-4-methylphenol | 0.6 DLTDP | 54 | 83.1 | 77.7 | 74.6 | |
| 0.2 Polypropylphenol | None | 1 | 83.5 | | | |
| 0.5 Polypropylphenol | do | 3 | 82.3 | | | |
| 1.33 Polypropylphenol | 0.67 DLTDP | 73 | 83.5 | 76.5 | 74.0 | 72.0 |
| 0.66 Polypropylphenol | 0.34 DLTDP | 60 | 83.4 | 75.4 | 74.6 | |
| 0.53 Polypropylphenol | 0.27 DLTDP | 50 | 83.8 | 77.4 | 73.4 | |
| 0.40 Polypropylphenol | 0.20 DLTDP | 40 | 81.9 | 79.4 | | |
| 2.0 Polybutylphenol | None | 3 | 82.1 | | | |
| 1.0 Polybutylphenol | do | 3 | 81.6 | | | |
| 0.5 Polybutylphenol | None | 3 | 82.3 | | | |
| 1.5 Polybutylphenol | 0.5 DLTDP | >73 | 82.5 | 76.2 | 76.5 | 74.8 |
| 0.75 Polybutylphenol | 0.25 DLTDP | 47 | 82.1 | 74.3 | 75.2 | |
| 0.37 Polybutylphenol | 0.13 DLTDP | 47 | 82.9 | 74.9 | 76.3 | | combination is present in an amount of about 0.1 percent and about 3%, by weight, relative to the tactic poly-α-olefin.

3. The composition of claim 2, in which said poly-α-olefin is tactic polypropylene.

4. The composition of claim 2, in which said diester is the lauryl ester.

5. The composition of claim 3, in which said diester is the lauryl ester.

References Cited

UNITED STATES PATENTS

| | | |
|---|---|---|
| 2,434,662 | 1/1948 | Lantham et al. __ 260—45.95 X |
| 2,655,544 | 10/1953 | McNulty et. al. ___ 260—624 X |
| 3,180,850 | 4/1965 | Van Schooten et al. _ 260—45.95 |

DONALD E. CZAJA, *Primary Examiner.*

M. J. WELSH, *Assistant Examiner.*